United States Patent

Hempill et al.

[11] 4,199,327
[45] Apr. 22, 1980

[54] PROCESS FOR GASIFICATION OF COAL TO MAXIMIZE COAL UTILIZATION AND MINIMIZE QUANTITY AND ECOLOGICAL IMPACT OF WASTE PRODUCTS

[75] Inventors: Hugh G. Hempill, Pleasonton; Robert E. Hurney, San Francisco, both of Calif.

[73] Assignee: Kaiser Engineers, Inc., Oakland, Calif.

[21] Appl. No.: 956,263

[22] Filed: Oct. 30, 1978

[51] Int. Cl.² .............................. C10J 3/16; C10J 3/46
[52] U.S. Cl. ........................................ 48/202; 48/203; 48/206; 48/DIG. 7; 60/39.02; 252/373; 260/449 M; 260/449.5; 423/359; 423/648 R
[58] Field of Search ................. 48/202, 203, 206, 210, 48/DIG. 7; 282/373; 260/449 M, 449.5; 60/39.02; 423/359, 648 R

[56] References Cited

U.S. PATENT DOCUMENTS

| 3,951,617 | 4/1976 | Crouch | 252/373 |
|---|---|---|---|
| 3,966,634 | 6/1976 | Sacks | 48/202 |
| 3,971,635 | 7/1976 | Matthews | 48/202 |
| 3,986,349 | 10/1976 | Egan | 60/39.02 |

OTHER PUBLICATIONS

"Coal Gasification for Industrial Use and Power", Merer et al., CIM Bulletin Jun. 1978.

Primary Examiner—S. Leon Bashore
Assistant Examiner—Peter F. Kratz
Attorney, Agent, or Firm—Naylor, Neal & Uilkema

[57] ABSTRACT

Coarse, graded coal is fed to a pressurized relatively fixed bed, non-slagging gasifier from which crude gas is recovered. Fine coal is slurried in an aqueous mixture comprising the discharge from the relatively fixed bed gasifier, which discharge is composed of hydrocarbons, phenolic water and other liquids as major components and additional makeup water, if required, and the slurry is fed to a slagging, pressurized entrained flow gasifier from which additional crude gas is recovered. The two streams of gas are cleaned and then used to meet a variety of demands, including, but not limited to, gas turbine generation of electric power, manufacture of synthetic natural gas and manufacture of methanol.

13 Claims, 4 Drawing Figures

PROCESS FOR GASIFICATION OF COAL TO MAXIMIZE COAL UTILIZATION AND MINIMIZE QUANTITY AND ECOLOGICAL IMPACT OF WASTE PRODUCTS

BACKGROUND OF THE INVENTION

1. Field of the Invention

This invention relates to an improved process for the gasification of coal. The process makes maximum use of run-of-the-mine coal and otherwise environmentally unattractive waste products for maximum recovery of useful gas products. In this era of energy shortage and need for protection of the environment, the need for an economical and effective process for coal gasification is vital.

2. Description of the Prior Art

The prior art can best be described by reference to descriptions of fixed bed non-slagging, air and oxygen blown gasifier systems on the one hand which utilize coarse coal as feed stock, and slagging, pressurized entrained flow gasifier systems on the other hand which utilize oxygen and a slurry of finely ground coal as charge stock, each of which systems constitute independent, self-contained units available for use according to the selection by a prospective operator.

Fixed bed gasification systems and entrained flow (or dilute phase) gasification systems are well-known. By the relatively fixed bed system, coal is converted into gas in a continuous process utilizing reasonably deep fixed beds, as exemplified in the conventional gas producer, or the Lurgi generator which operates with air-stream blasts or oxygen-steam blasts at pressures up to 30 to 50 or even higher atmospheres. Typical descriptions of fixed bed non-slagging gas generator systems are disclosed in Gas Engineers Handbook, 1974 by Industrial Press Inc., Chapter 9, pages 3/103 to 3/107, inclusive. Other references which discuss the Lurgi fixed bed type of gasifier are U.S. Pat. Nos. 2,834,665 to Rudolf, et al of May 13, 1958 and U.S. Pat. No. 2,799,565 to Just of July 16, 1957.

In the Lurgi system, coarse coal is intermittently fed to the gasifier through lockhoppers and gasification takes place in the downwardly moving bed of lump coal. This process has good thermal efficiency but has a major disadvantage in that the coal feed to the gasifier must be closely graded to eliminate coal fines which respresent a large proportion of the output from a coal mine, frequently on the order of 25 to 40 percent of the mine output. Other disadvantages are that the hydrocarbon by-products from the process require an inordinately large investment of capital and operating cost to refine them for selling into the market. Further, phenolic water and other dissolved organic materials discharged as waste from the process presents a severe disposal problem and equipment to extract it is both expensive and complex.

Gasification of coal by the entrained flow or dilute phase technique, utilizes a slurry of pulverized coal that is entrained in a gasification medium consisting of steam and/or water, plus oxygen and/or air. The mixture is blown continuously into a refractory-lined gasifier operating at atmospheric or higher pressures, a sequence of oxidation and steam decomposition reactions occurs. The product gas generated ranges in quality from producer gas to water gas or synthesis gas, depending upon oxygen concentration of the gasifying medium. The effective operation requires high temperatures, normally above the ash fusion point so that slagging conditions are readily obtained. This system has disadvantages because the coal feed must be completely pulverized and the oxygen requirement per unit product gas is very high.

Typical of the slagging pressurized entrained flow gasifier utilizing oxygen and a slurry of finely ground coal as charge stock are the following patents:

U.S. Pat. No. 2,761,824 to Eastman, et al Sept. 4, 1975
U.S. Pat. No. 2,595,234 to Eastman May 6, 1952
U.S. Pat. No. 3,715,195 to Tassoney, et al Feb. 6, 1973
U.S. Pat. No. 3,715,301 to Tassoney, et al Feb. 6, 1973

It is essential in each of the foregoing that finely ground or pulverized coal be used as feed stock after slurrying with a variety of liquids. Although several advantages are alleged, the process is not entirely satisfactory because it uses only pulverized coal and consumes large quantities of oxygen.

The only prior art known to applicant to a combination of two different gasification processes appears in the Gas Engineers Handbook 1974, Industrial Press Inc., Chapter 9, page 3/107, where brief reference is made to a new technique embodying a combined fixed bed and fluid bed operation that has been under development. However, the reference relates to the combination of two generators in parallel, both of which use various grades of finely divided fuel in a fluidized condition.

Other patents which show coal gasification processes wherein separate streams of coal are utilized are U.S. Pat. No. 4,017,270 to Funk, et al of Apr. 12, 1977 which refers to separate confined paths of coal particles utilized in a single gasifier, and U.S. Pat. Nos. 3,971,635 and 3,971,636, both to Matthews of July 27, 1976, which use a second stream of gas as fuel in the combustion zone and not as feed to a gasifier to create a source of gas for recovery of fuel.

SUMMARY OF THE INVENTION

The present invention provides an improved process in that it is a hybrid cycle, wherein the slagging and non-slagging coal gasifiers are arranged for balanced parallel operation to produce maximum usable fuel gas, no liquid by-products and no phenolic waste water. Full advantage is taken of the higher thermal efficiency of fixed bed non-slagging coal gasifier systems. All coal fines that might otherwise have to be discarded are used as feed for the slagging entrained flow gasifier. These fines are first slurried with a mixture of the liquid effluent from the non-slagging fixed or slowly moving bed gasifier (i.e., hydrocarbons and phenolic water which would otherwise be waste from the non-slagging gasifier) along with any make up water required to obtain a slurry of proper viscosity. Thus, the inability of a fixed or slowly moving bed gasifier to use coal fines is overcome by the process of this invention by diverting the fines to the suspension gasifier section where they are sized to a fineness required for use in the suspension gasifier feed slurry. Accordingly, it is possible to choose a coal sizing specification for the fixed bed unit that permits more efficient gasifier operation.

The Lurgi Gasification Process as contemplated herein is a fixed bed process in which a slowly moving bed of coal is gasified with oxygen containing gas and steam.

The crushed and graded coal from feed storage is fed by gravity into the gasifier through a lock hopper located above the reaction vessel and arranged to cooperate in feeding the coal to the pressure vessel. An internal rotating distributor evenly distributes the fresh feed stock across the top of the slowly descending bed. The other reactants, air and steam, are introduced at the bottom of the reaction zone through the rotating ash grate.

Disposal of waste liquids produced by the non-slagging gasifier is also solved by diverting them to the entrained flow gasifier unit where they are used as a major component of the slurrying liquid for the coal fines. These liquids which are otherwise normally difficult and expensive to recover, purify and market are simply and economically converted into usable fuel gas. Accordingly, by elimination of fractionation equipment, and other equipment for the separation and treatment of the waste hydrocarbon materials, and the simplification of waste water treating equipment due to the elimination of phenols, the capital expense for the fixed bed non-slagging gasifier is measurably reduced, more material is available for fuel gas production and a severe disposal problem caused by the waste is solved. The combustibility of part of the slurrying liquids reduces the oxygen requirements for the slagging entrained flow gasifiers in contrast to the normal coal-water slurries used as feed material for them.

As one example of the use of this invention, it is possible for the entire system to be sized so that in a combined cycle power plant the continuous electrical load fuel requirements thereof will be supplied by air blown fixed or slowly moving bed units, normal demand variations will be handled by addition of gas from oxygen blown entrained flow units and peak demand may be served by addition of fuel grade methanol which has been produced from surplus oxygen blown gas not used directly as fuel gas.

BRIEF DESCRIPTION OF DRAWING

The invention will be further understood by references to the accompanying drawings wherein an illustrative embodiment is shown.

In the drawings.

DETAILD DESCRIPTION OF INVENTION

Figure 1:
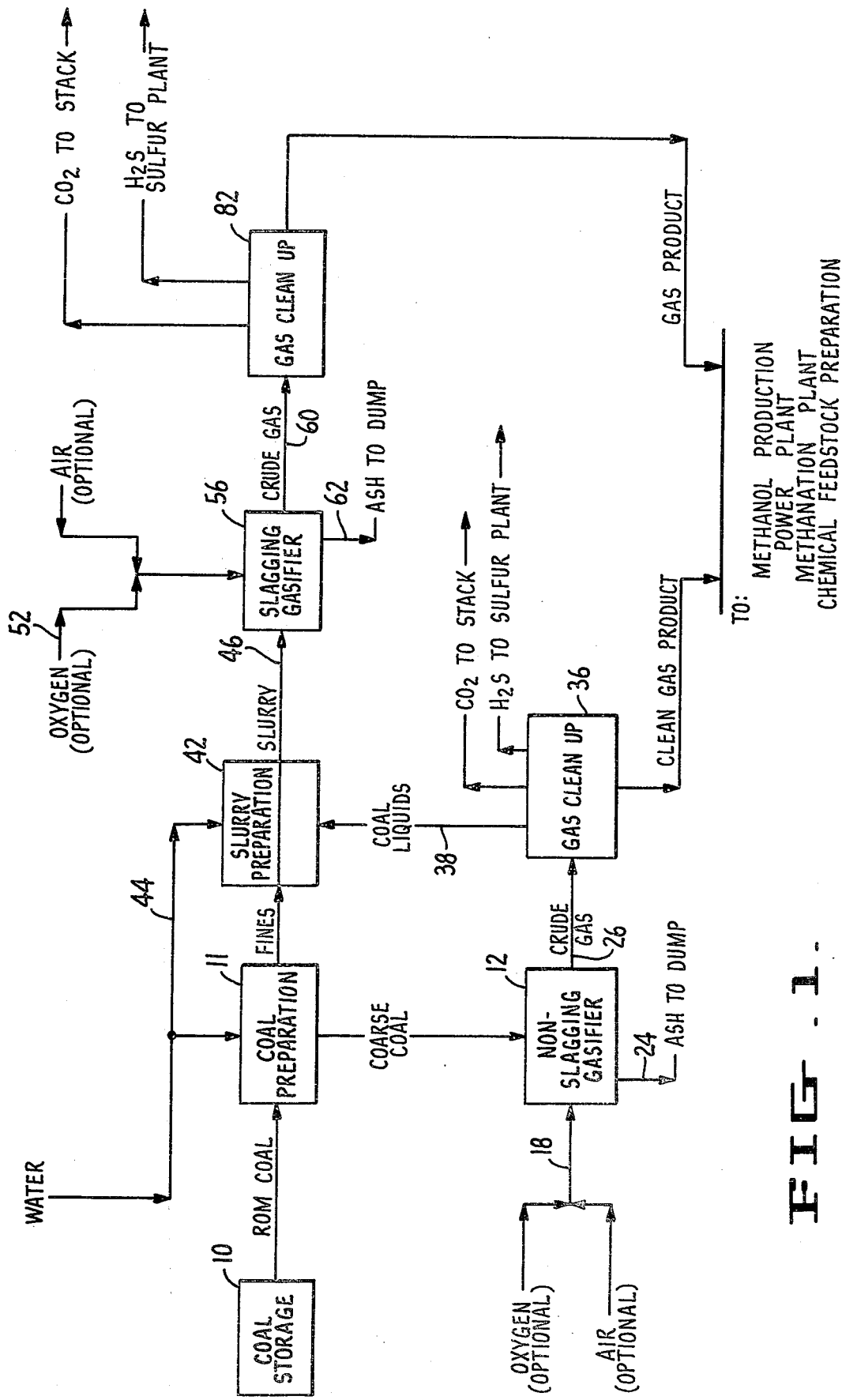
FIG. 1 is a schematic block flow diagram illustrating the principal process steps of the present invention.

Referring now to the drawings, wherein the essential steps of the process are shown in conjunction with the application of the process to a combined cycle power plant. Run-of-the-mine coal is withdrawn from storage 10 and charged to a coal preparation area 11, where it is crushed, ground and graded. The coarse fraction is transferred to the charging bunker of the fixed bed gasifier by conventional surge bin means. The fines for the suspension gasifier are transferred to a surge bin ahead of the feed slurry mix tank for that unit as will be described later.

Figure 2:
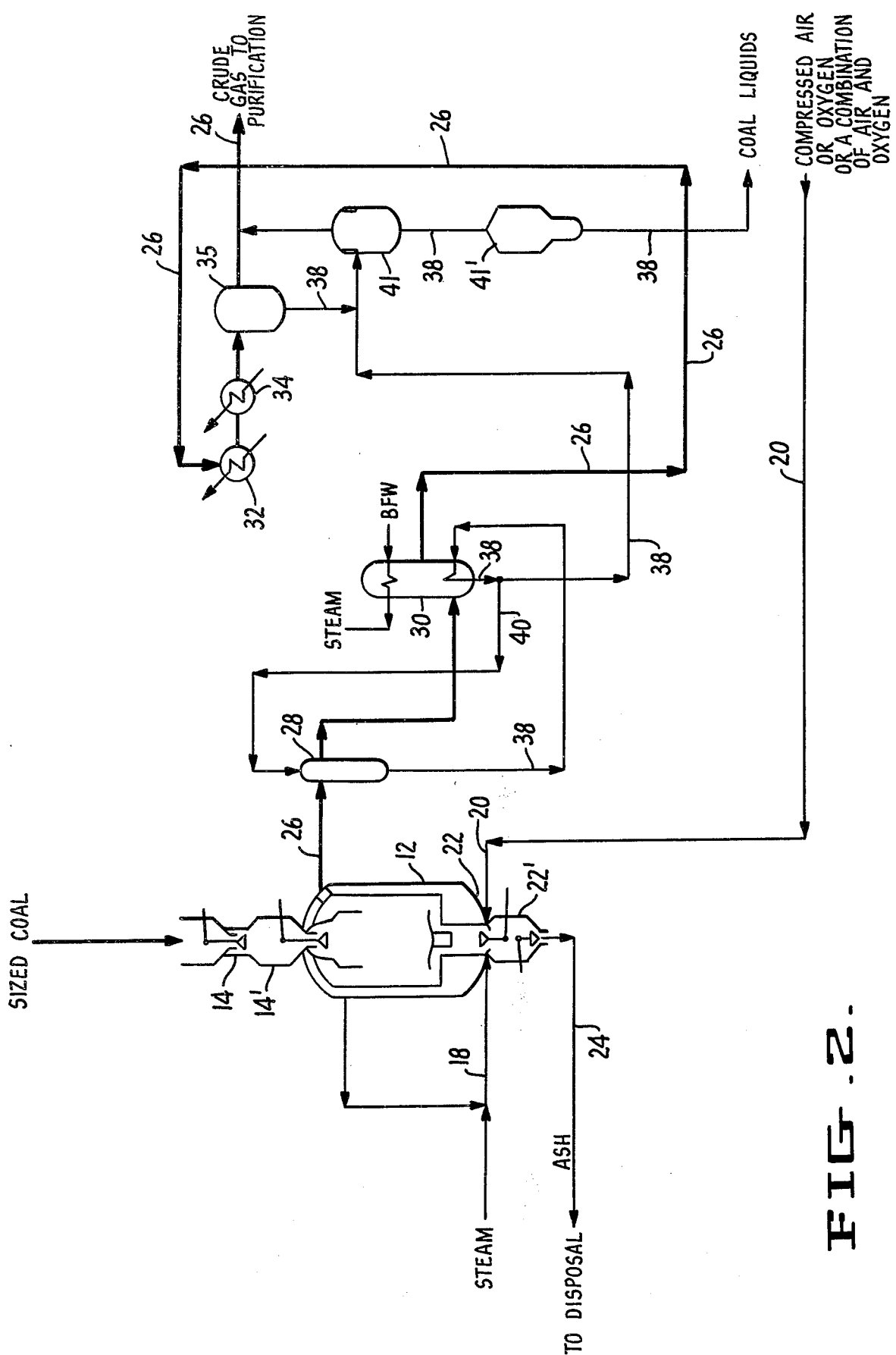
FIG. 2 is a schematic flow sheet of one method of gasification of a non-slagging gasifier of the Lurgi type as used to produce crude gas in one of the systems of the invention.

The coarse, graded coal, desirably about ⅜ in. or more in size, is fed to the non-slagging gasifier from storage and charged at an even rate as required in the system. This crushed, graded and properly sized feed stock is introduced into gasifier 12 through a lockhopper system 14 and 14' which cooperates with cleaned crude gas to create a pressure level within the feed system that is in balance with the pressure level within the gasifier chamber of vessel 12. One typical arrangement of a lockhopper valve system is shown in U.S. Pat. No. 2,925,334 to Henze, et al. The non-slagging fixed bed gasifier 12 is a water jacketed vessel which operates at pressures within the range of 300 to 500 pounds per square inch. Streams of steam and air under pressure are injected at the bottom of gasifier 12 through lines 18 and 20 (FIG. 2) and the air and steam moves rapidly upwardly through the fuel bed of coarse coal in gasifier 12.

The fuel bed in the vessel is characterized by zones of different temperatures, that is (1) an ash zone at the generator bottom, (2) an oxidation zone or region of heat supply, (3) a reduction zone or region of steam decomposition, and (4) a preheat zone where the incoming fuel charge is dried and heated to operating temperature by up-flowing hot gases. The coal feed of relatively coarse grade without fines which may be lump bitminous, anthracite or green coals or lignite of a size that enables the countercurrent flow of air and steam through the zones. Normally the retention time of the coal within the fixed bed gasifier is between about one and three hours. Also, the various zones remain at approximately the same locations in the vessel as the "relatively fixed" fuel bed moves through the zones.

The term "fixed bed" as used herein with respect to non-slagging gasifiers includes those gasifiers wherein the bed moves through various zones in the gasifier and in which different temperatures and operating conditions may exist, as is the case with the Lurgi gasifier. The term also incudes those gasifiers wherein the bed remains fixed during the entire operation. In any event, it is to be distinguished from the "entrained" slagging type of gasifier which is more completely described hereinafter. (See Gas Engineers Handbook, 1974, Chapter 9, pgs. 3/103 and 3/104).

The lockhopper system 14 and 14' feed a rotating distributor (not shown) which causes fresh feed stock to be evenly distributed across the top of the slowly descending bed in gasifier 12.

The air or oxygen and steam introduced at the bottom of gasifier 12 and below the ash zone and within the gasifier provides excellent conversion efficiencies because of the countercurrent flow of the reactants, and also cool the grate and reduce the clinkering tendency of the ash.

The bottom of gasifier 12 includes a grate system (not shown) which discharges the ash through another lockhopper system 22 and 22' wherein the ash is cooled and depressurized prior to being transferred to ash disposal 24.

The benefits of this method of reactant injection are maximized conversion efficiencies resulting from countercurrent operation, and control of gasifier reaction temperatures to reduce the clinkering tendency of ash. As the coal descends through the Lurgi reactor, the temperature of the solids are progressively increased. In the uppermost drying zone or section, the moisture, gaseous components and low boiling oils in the coal are vaporized. As the carbon rich coal moves down into the "shift" section, it contacts the hot gases rising from the "reaction" zone below and a portion of the carbon is gasified to carbon monoxide. The unreacted carbon enters the reaction zone where it is combusted with the incoming air to provide heat for the reactions above.

The steam introduced into the reaction initially serves to cool the rotating grate and ash at the bottom of the reactor. As the steam rises through the reactor, a portion of it participates in the cracking reaction which contributes hydrogen and carbon monoxide to the product gas stream.

In a typical operation, air and steam are passed through the bed at about 350 lbs./sq. in. pressure and at a temperature of about 900° F. to cause the coal to gasify and break down into crude gas of about 150 BTU containing hydrocarbons and other gaseous and particulate impurities.

Hot crude gas having a heating value ranging from 150 BTU to about 500 BTU at a temperature of between about 500° F. and about 900° F. to about 1,000° F. is discharged in line 26 from the top of the gasifier 12 and passes through a direct contact eductor 28, where it is scrubbed with recycled tars and oils to remove high boiling volatiles and entrained particulate matter. The liquid discharge from the bottom of the scrubber eductor system 28 is separated from the gases in a conventional manner and passed through a waste heat recovery boiler 30 where the gas temperature is reduced to about 300° F. The overhead crude gas stream 26 from the scrubber system passes through a waste heat recovery boiler 30 to provide heat for producing low pressure steam and the gas temperature is reduced to about 300° F. The crude gas stream 26 is then passed through a heat exchanger 32 and further cooled. Exchanger 32 may be designed to provide reactivation heat for the absorbent in the low BTU acid gas removal system. The final cooling of the crude gas stream is accomplished with a condenser 34 and passed through separator 35, which reduces the gas temperature to about 100° F, the level required for the acid gas removal system. Accordingly, in a typical operation 150 BTU gas, having an entrance temperature of about 900° F., is then passed through scrubbers and then through condensers to remove particulates and to recover a liquid stream at a temperature of about 100° F. The 150 BTU crude gas stream is then passed into a purification system for removal of hydrogen sulfide and coabsorbed carbon dioxide as described below.

The gas in line 26 then passes into a gas clean-up system 36, the details of this plant are not shown because it can take the form of any standard gas purification plant. Its principal function is to remove hydrogen sulfide and coabsorbed carbon dioxide and to recover sulfur as the only waste product thus far from the fixed bed non-slagging gasifier 12. In eductor 28 wherein the crude gas is separated initially from the condensed coal liquids emitted by the gasifier 12 the stream of liquids 38 also pass through the waste heat boiler system 30 and are further cooled. A portion of the liquids are recirculated through line 40 to eductor 28 to assist in the scrubbing and cooling operation, however, the main stream is passed through line 38 into a series of separators 41 and 41' from which any remaining crude gas is separated immediately prior to its transfer to the purification plant above discussed. The coal liquids are then pumped from the separating system through line 38 to the coal slurrying plant for the entrained flow gasifier to be later described.

It is to be understood that the above gas clean-up system is by way of example and can be modified in any manner desired by those skilled in the art, whereby the crude gas is scrubbed of all volatiles and particulates and is in a condition where hydrogen sulfide and coabsorbed carbon dioxide can be readily removed in a standard gas purification plant. In like manner the steam and liquids are condensed and recirculated as required to recover the maximum hydrocarbon components available from the fixed bed gasifier 12 so that tars, oils, phenol water and the like are contained in the slurrying medium for the entrained flow gasifier in an amount that will contribute significant fuel value to the gas source raw material fed to the gasifier.

It is also to be understood that this invention is not limited to the use of a Lurgi type relatively fixed bed non-slagging gasifier, and can, for the purposes of the portion of the system heretofore described, use any gasifier employing sized, coal of not less than ⅛ in. through which a stream of air or oxygen can be passed in countercurrent flow within a sustained reaction zone in which there is a relatively long retention time for the coal whereby full advantage can be taken of the thermal efficiency of such a system and little concern need be given to the waste product steam, liquids and particulates containing what might otherwise be objectionable products.

It is in this system that one of the main advantages of the present invention resides, that is, these waste products which are tars, oils, phenol waters and other materials as previously discussed, do not have to be removed by high capital, complicated separation plants and the like in order to satisfy environmental and other requirements. In contrast these materials contained in the liquid system leaving the fixed-bed gasifier area are utilized effectively as a feed stock in the next step of the process utilizing a suspension type of gasifier.

The slagging suspension gasifier system of this invention is designed to produce additional crude gas. In one very useful system to accomplish the objectives of this invention coal fines from preparation plant 11 are slurried with the coal liquids 38 in slurry preparation plant 42. Recirculated liquids from the entrained flow gasifier system are also used in preparing the slurry. Additional make-up water 44 can also be used if required. The objective is to thoroughly mix the slurry and attain a viscosity which is a pumpable slurry 46. The slurry is preheated in heat exchanger 48 prior to entering the gasifier. Air or oxygen 52 is mixed with the preheated slurry 46 at the top section 54 of suspension gasifier 56, and desirably the slurry and the air or oxygen are charged coaxially to the refractory lined pressure vessel which is the reaction chamber of gasifier 56.

If required, and in a typical operation oxygen for the suspension gasifier 56 may be produced in a standard air separation plant. In such a unit atmospheric air is compressed in a centrifugal compressor, after which it is cooled to liquifaction temperature in reversing heat exchangers. In addition to cooling the incoming air, the contained water vapor and carbon dioxide are frozen out on the exchanger surfaces. The refrigeration required for this cooling process is provided for in part by expanding the inlet stream through an expansion turbine. The remainder of the refrigeration requirement is supplied by the outgoing cold gaseous oxygen and nitrogen streams. During the regeneration part of the cycle, water and carbon dioxide are flushed out of the reversing exchangers by passing warmed low pressure waste nitrogen through the partially fouled air passages. The purified and cooled incoming air stream enters a high pressure column where a primary separation takes place and crude liquid oxygen is produced.

Final separation resulting in high purity oxygen occurs in a lower pressure distillation column. Pure oxygen and waste nitrogen leave the low pressure column and pass through separate sections of the reversing exchangers. Waste nitrogen is vented and the high purity oxygen is compressed for injection into the gasifier.

Desirably the heated slurry and oxygen are charged coaxially to the refractory line pressure vessel which comprises the reaction chamber of the entrained flow gasifier. The reaction occurs at about 2000° F. in the reaction vessel 56. This gasification reaction takes place at a temperature well above the slagging temperature of the ash in the coal and slurry feed.

The entrained flow gasifier into which the slurry with oxygen is charged is maintained under a pressure of about 500 lbs./sq. in. The mixture reacts rapidly in the gasifier to form a crude gas of about 350 BTU at at temperature of about 2,000° F.

The gasification takes place during a very short period of time of less than 10 seconds at temperatures in excess of 2000° F. with crude gas and ash as the products. A small percentage of the crude gas and the majority of the ash generated in the gasifier is cooled by direct quench with water under pressure in quench chamber 58. The largest portion of the crude gas is drawn off as stream 60 through side arm 62 ahead of the quench chamber and at a temperature of about 2000° F.

Figure 3:
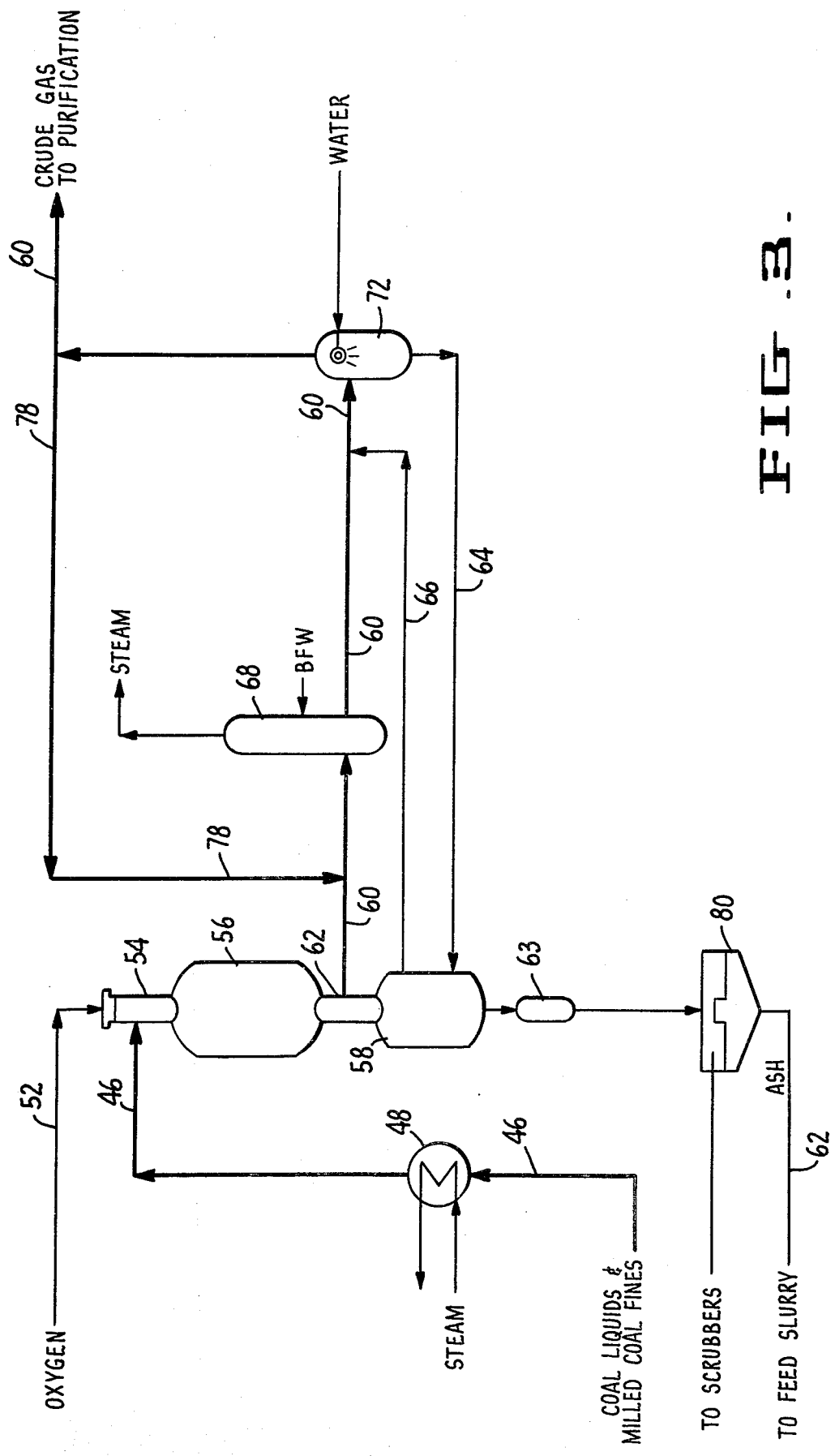
FIG. 3 is a schematic flow sheet of one method of application of the slagging suspension gasifier used to produce crude gas in the other system of the invention.

A small amount of scrubbed and cooled gas flowing through line 78 is mixed with the primary gas stream 60 leaving at side arm 62 and reduces the temperature of the gases well below the ash fusion temperature. The crude gas 60 is passed to a waste heat boiler 68 and steam is generated for use in the system. Crude gas that has flowed into and been chilled in the quench chamber 58 is returned to stream 60. The crude gas stream is now subjected to a series of reverse flow water scrubbers of which 72 is typical (see FIG. 3) which further cool and ultimately reduce the residual particulate matter in gas 60 to a level that is acceptable for compressor suction and other ultimate uses.

Water from the series of separators is pumped through line 64 to serve as the chilling media for quench chamber 58. Ash from the quench chamber 58 passes through ash removal system 63, all of which is contained within a lockhopper system (not shown). The lockhopper isolates and prevents depressurization of the suspension gasifier 56. Also, the water from the series of scrubbers may be combined with the overflow from the ash quench chamber into thickener 80. The thickener underflow is dewatered and sent to ash disposal and a portion of the thickener overflow is recycled into the feed slurry and the remainder is sent as blowdown to an effluent treatment facility. The overhead crude gas from the final scrubber is now transferred for further down stream processing for gas purification in plant 82.

It is to be understood that this invention is not limited to the use of any particular type of entrained flow gasifier and that any suitable system may be used which can work efficiently with the fine fraction of coal to be slurried with the coal liquids and any water used in forming the pumpable slurry fed to an entrained flow gasifier.

After the final trim cooling and stripping of liquids, the gas streams 26 and 60 are processed in acid gas removal sytems 36 and 82. In such systems a portion of the carbon dioxide is removed from the gas streams along with the hydrogen sulfide. To accomplish removal of hydrogen sulfide in a typical system the cooled crude gas stream is passed countercurrently through a packed bed absorber where it is brought into contact with a cool liquid absorbent solution.

The acid gas laden (or hydrogen sulfide rich) absorbent solution is discharged from the bottom of the absorber and is transferred to a reactivator for regeneration and the sweet product gas stream is discharged from the top of the absorber, ready for use as fuel gas.

The rich solution is heated and enters a reactivator, where the hydrogen sulfide laden acid gas is desorbed. The liberated acid gas leaves the system at the top of the reactivator, is cooled, and sent to the sulfur recovery unit. The hydrogen sulfide lean solution leaving the reactivator is cooled and recirculated to the absorber.

Sulfur recovery may be accomplished in a conventional Claus unit provided with a tail gas treater. The chemistry of the Claus unit is based on a burning part of the hydrogen sulfide to produce sulfur dioxide which in turn reacts catalytically with the remaining hydrogen sulfide to form elemental sulfur and water.

The collected hydrogen sulfide stream is divided so that approximately ⅓ is burned in the boiler to produce sulfur dioxide and a small amount of sulfur. The heat of combustion from the hydrogen sulfide stream that has by-passed the boiler and these combined gases are passed through a series of two catalytic bed reactors and their associated heat recovery exchangers. Approximately 95% of the original sulfur is recovered as liquid from these two reactors.

The unconverted or tail gas from the Claus unit is transferred to a treatment unit which is a liquid phase catalytic system that converts approximately 90% of the remaining sulfur compounds to elemental sulfur, resulting in an overall sulfur recovery in excess of 99%.

The sulfur recovery plant may also be of any effective design for removal of elemental sulfur and carrying out the purposes above discussed, and is not intended to be limited to a Claus plant.

EXAMPLE 1

Figure 4:
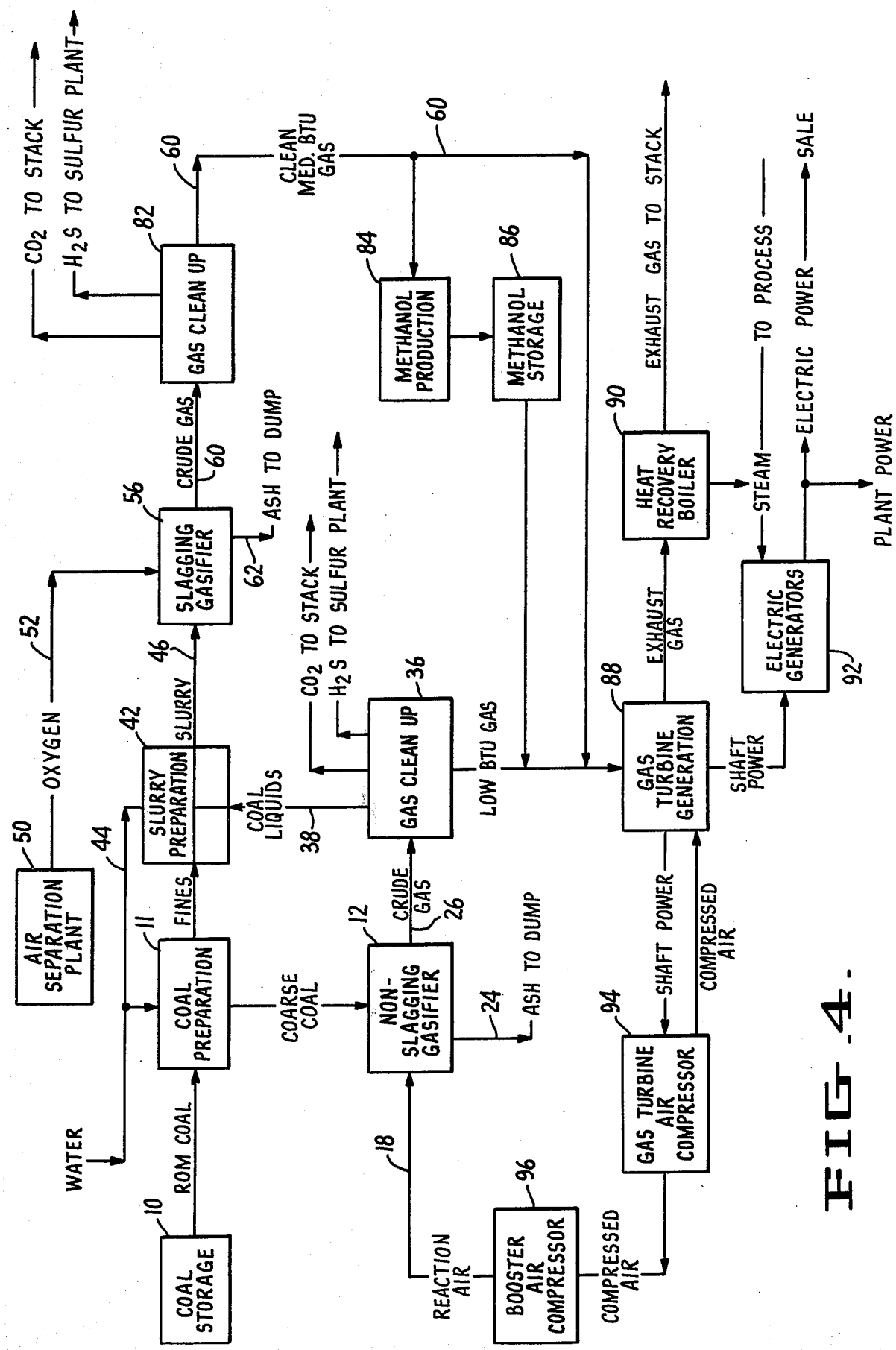
FIG. 4 is a schematic block flow diagram illustrating the principal process steps of the invention as employed in a combined cycle power system.

The following is one example of a typical application of the process as it might be used in combination with a combined cycle power plant using gas turbines, as shown in FIG. 4.

Run-of-the-mine coal is ground, crushed and separated so that coarse particles of not less than ⅜ inches are sent to the fixed bed gasifier and ground fines at least 70% of which will pass 200 mesh are sent to the entrained flow gasifier system.

The coarse coal is fed under pressure into the fixed bed gasifier which is maintained at about 350 lbs/sq. in. pressure. As it passes through the gasifier air and steamflow countercurrently through the coarse coal and it reacts to form crude low BTU gas, which is passed from the fixed bed gasifier at about 700° F. along with the steam through a series of scrubbers, waste heat boilers, heat exchangers and separators wherein the crude gas is separated from the particulates and the steam and coal liquids are condensed. The condensed liquids contain particulates, various liquid hydrocarbons, phenols and other waste materials as heretofore discussed. The crude gas is then cooled to about 100° F. and is sent to a low BTU gas purification system.

The coal liquids are slurried with the coal fines originally separated from the run-of-the-mine coal after milling and are then mixed together along with make-up and recycled water to form a pumpable slurry which is passed to the entrained flow gasifier of the type described above.

The slurry is preheated to a temperature of about 300° F. and is coaxially fed to the gasifier which is maintained at about 500 lbs/sq. in. pressure and reacts in about ten seconds or less to form crude medium BTU gas. The gas is then circulated through coolers, condensers and scrubbers of various designs, including waste heat boilers, heat exchangers and scrubbers of the type above described, to remove fly ash and condense liquids. The liquids and fly ash are returned to a quenching system which cools the ash and removes it for thickening and recirculation of the overflow.

The medium BTU gas emerging from the entrained flow gasifier is at about 2000° F. and as it passes through the various cooling and scrubbing systems heretofore described the temperature is reduced to about 100° F. prior to being introduced into a medium BTU gas purification sytem for removal of hydrogen sulfide and carbon dioxide.

Essentially the same purification system is used for the low BTU gas. In both cases, the hydrogen sulfide and $CO_2$ are passed to a standard Claus plant wherein the hydrogen sulfide is converted to elemental sulfur. The separate streams of gas are then sent to the various plants where they are intended for use, such as combined cycle power plants. The clean medium BTU gas which has been purified can in the meanwhile be converted to a methanol and stored for use in peak period requirements in the combined cycle power plant or can be used in the preparation of synthetic gas or for other purposes depending on the requirements of the user.

It is to be noted, the gasifier which is disclosed in the specification as above described is one form of entrained flow gasifier which has been found useful. Other forms of such gasifiers which utilize the same type of feed and react in the same manner to produce medium BTU gas compatible with a combined cycle, hybrid cycle system, can be utilized in this invention.

Production of medium BTU gas herein is at a constant rate and is used for either peaking power or for production of alcohol, including methanol production in a conventional system. The peaking load demand is cyclical and there are periods during the daily operating cycle when all medium BTU fuel gas is not utilized for power production. During these low power demand periods, "excess" medium BTU gas is converted into methanol at 84 and stored at 86 for later use as shown in FIG. 4. Methanol has several advantages in that it can be produced from medium BTU gas using proven technology; it is easily stored in a liquid form, and it can be burned in gas turbines to provide additional power during maximum peaking periods.

In production of methanol the ratio of the oxides of carbon to hydrogen in the medium BTU gas is critical. The ideal ratio for methanol production is $H_2/(CO + 1\frac{1}{2}CO_2) = 2.0$. Normal operation of some entrainment flow gasifiers produce a gas that will require a hydrogen supplement to satisfy this ratio. This additional hydrogen will be produced by passing a portion of the gas through a shift reactor in which carbon monoxide is reacted with water to produce carbon dioxide and hydrogen. This stream is mixed with the direct feed stream to produce the synthesis gas stream. The combined gases are purified first in a scrubbing unit similar to those used to purify the fuel gases, but designed to remove considerable amounts of carbon dioxide. Essentially, complete sulfur removal from the synthesis gas stream is necessary to prevent methanol synthesis catalyst poisoning and this is accomplished by adsorption on zinc oxide, or a similar adsorbent.

The purified synthesis gas is compressed to methanol reactor pressure. This fresh feed gas stream is mixed with the discharge of a recycle compressor to provide the feed stream to the methanol synthesis reactor. Before entering the reactor, this feed stream is brought up to reaction temperature by countercurrent heat transfer with the reactor product effluent. The heated high pressure feed stream enters the converter where the oxides of carbon are reacted catalytically with hydrogen to produce crude methanol. After discharge from the methanol exchanger, the reactor product is passed through an air cooler where the crude methanol is condensed. The unconverted synthesis gas is recycled to the reactor by a recycle compressor, which recompresses the overhead gas to reactor pressure for mixing with the feed gas. A portion of the recycle may be drawn off to prevent accumulation of inert materials. This gas stream has fuel value and is disposed of by injection into the fuel distribution system. The liquid methanol is held in a storage tank 86 until it is needed for peaking fuel in the combined cycle power plant.

When the gases produced as described herein are used for generating power, the instantaneous power demand is used to control the ratio of the so-called Hybrid cycle fuel products that are charged to the gas turbine 88. Low BTU gas is burned exclusively for baseline power production. Medium BTU gas is distributed as necessary to peaking power production, and/or methanol production. During peak demand periods when the combined low and medium BTU fuel gas production rates are not not sufficient to meet the power demand, methanol is used as an additional fuel source.

Combined cycle power production may be closely integrated into the overall gasification process using the hybrid cycle described above. Hybrid cyle as used herein means two complementary gasification systems arranged to maximize coal utilization and minimize undesirable waste products.

A combined cycle power plant consists of combustion gas turbine generators 88 with heat recovery boilers 90 on the exhaust to generate steam from the hot turbine exhaust gases. This steam is supplied to condensing steam turbine generators to add to the plant power production. The steam system from the heat recovery boilers is interconnected with the gasification plant steam systems for maximum steam utilization.

The power generation machines may be divided into base load machines and peaking machines. The base load machines will be fueled with low BTU gas from the fixed bed gasifier area. The peaking machines will be fueled with either gas from the entrained flow gasifier or by methanol. Any mixture of these fuels may also be fired. If an entirely base loaded plant were desired, the methanol fuel would be eliminated and all fuel gas would be burned directly in the gas turbines.

The performance of the heat recovery boilers on the gas turbine exhaust is enhanced by full load gas turbine operation and closely compliments the base load machines. However, if the area peaking requirements are such that the peaking gas turbines can be operated for several hours near full load, additional steam can be generated from this exhaust. In this case, the steam turbine generator in the base load area would be incrementally enlarged to be able to accept the steam from the peaking units.

The combustion gas turbine generators 88 should advantageously include a shaft driven air compressor 94 in addition to a gas turbine and an electrical generator. This compressor supplies combustion air to the unit combustors where the air and fuel are burned to provide the motive power for the turbine. The compressor discharge pressure is approximately 150 psig. Under certain operating conditions a portion of the gas turbine air compressor output can be extracted ahead of the combustion chambers for other uses. This air should be further boosted in pressure 96 and can then be used as the air feed to the fixed bed gasifiers.

The gas, air, steam and electrical power systems in the combined cycle area and in the gasification areas are desirably completely integrated to achieve maximum utilization, efficiency and reliability.

A combined cycle power plant is one of the most efficient, commercially available, means to convert fuel to electrical energy. However, the gas turbines require a suitable clean fluel. The fuel gas and methanol produced by the process plant are ideal fuels. This combination of power and fuel production plants produces electrical energy from coal in an environmentally sound, economically attractive installation.

It has been pointed out in the preceding discussion that this invention is not limited to any one particular design of fixed bed gasifier or to any particular design of entrained flow gasifier. Also, each gasifier may use any form of oxygen containing gas ranging from air to commercially pure oxygen, (99.5% oxygen), including combinations thereof. The principal difference in employing a gas with higher oxygen content is that the recovered gas will have a higher heating value (BTU content) For example, industrially pure oxygen when used in a fixed bed gasifier will provide a grade of gas having a heating value ranging from 300 to 500 BTU while the use of air as the oxidant in such a gasifier would provide a gas having a BTU content of about 150. In each instance the temperature of the gas emerging from the fixed bed gasifier would range between 500 and about 1000° F. depending upon the moisture in the coal. In the case of the entrained flow gas the industrially pure oxygen would provide a grade of gas ranging from 300 to 350 BTU while a totally air blown oxidant would provide a gas with a heating value ranging between 60 and 125 BTU. In each instance the temperature of the gas would be about 2000° F.

The size of the coal feed to each of the two types of gasifiers has previously been pointed out as critical and materially different. In the case of the relatively fixed bed gasifier coal sizing would be no less than ⅛ in. while in the case of the entrained flow gasifier fine particles are necessary. These advantageously would be in the range of about 70% minus 200 mesh. However, particles in the amount of 30% up to 10 mesh can be used, and in fact larger particles may be introduced into the slurry so long as it remains pumpable (about 2000 centipoise) and the large particles do not clog the system.

The reactions which occur to produce the grades of gas referred to above are in the case of each gasifier substantially as follows:

a. $CO + H_2O = CO_2 + H_2$
b. $H_2 + \tfrac{1}{2}O_2 = H_2O$
c. $C + \tfrac{1}{2}O_2 = CO$
d. $C + O_2 = CO_2$
e. $C + 2H_2O = CO_2 + 2H_2$
f. $C + 2H_2 + CH_4$ Although several references in the specification refer to the use of the Hybrid process gasifier in connection with the generation of power, it is to be understood that the gaseous products produced according to the invention can be used not only as a fuel source for power plants, including combined cycle power plants, but are also useful in methanol or other alcohol production, as the gas source for a methanation plant and as chemical feed stock in the preparation of other products, including ammonia, various hydrocarbon compounds, including methane, and hydrogen. All such uses, whether separately or in combination, are regarded as within the scope of this invention.

It is to be noted that the principle products produced in the reactions set out above are $H_2$, $CO$ and $CH_4$ with lesser amounts of hydrocarbons in the range of $C_2$ to $C_8$.

The hybrid process system of this invention will also produce a synthetic natural gas consisting of more than 98% methane provided industrially pure oxygen is used in both the slagging and non-slagging gasifiers. Also such systems are capable of manufacturing a grade of medium BTU gas for transportation through a pipeline for ultimate use as industrial gas for chemical feed stock, as well as fuel to boilers, gas turbines and other energy sources, including combined cycle, turbine-powered generation stations, or steam-power plant generation.

One very important feature of the invention is the fact that it can use high sulfur coals because of its ability to minimize undesirable environmental effects. Also, coals of low heating value and friable coal can be used in the hybrid system.

Although the foregoing description represents a preferred and advantageous embodiment of the invention, it is to be understood that modifications may be made in the process and system by those skilled in the art without departing from the scope of the invention as herein defined.

What is claimed is:

1. A process for the gasification of coal wherein the total available coal is utilized in separate gasification systems and is converted into environmentally acceptable gaseous fuel and the quantity and type of waste products from said gasifier systems are kept to a minimum, comprising the following steps:
   (a) separating coal into a coarse fraction and a fine fraction,
   (b) feeding the coarse fraction to a fixed bed non-slagging gasifier in which,
      (i) oxygen containing gas and steam are blown through said fixed bed of coal within said pressurized gasifier at temperatures to cause the coal to gasify and break down into crude gas containing hydrocarbons and other gaseous and particulate impurities,
      (ii) passing said gas through scrubbers and through condensers to remove particulates and condensable components from said impurities as a liquid stream and to a first gas purification system for removal of hydrogen sulfide and coabsorbed carbon dioxide, (c) forming a mixture of said liquid stream and said fine fraction of coal to form a pumpable slurry, said liquid stream containing particulates and condensable impurities removed from the crude gas stream from said fixed-bed gasifier and comprising tars, oils and phenol water in an amount to contribute significant fuel value to said slurry, (d) passing said slurry with oxygen containing gas to an entrained flow gasifier maintained under pressure,
  (i) rapidly reacting said mixture in said entrained flow gasifier to form a crude gas,
  (ii) passing said gas from said entrained flow gasifier through particulate removal scrubbers and then to heat exchangers to a second gas purification system to remove hydrogen sulfide and coabsorbed carbon dioxide and
  (iii) removing the ash from said entrained flow gasifier, and (e) recovering said streams of purified gas.

2. The process of claim 1 wherein the coal separation step is carried out so that the pieces of said coarse coal fraction are ground to a size of not less than ⅛ in. and the particles of said fine coal fraction are crushed to about 70 percent minus 200 mesh.

3. The process of claim 1 wherein additional water is added to form said slurry of fine coal and said liquid stream to be fed to said entrained flow gasifier.

4. The process of claim 1 wherein the oxygen containing gas fed to said fixed-bed gasifier and to said entrained flow gasifier ranges in oxygen content from atmospheric air to pure oxygen and may vary as to each gasifier.

5. The process of claim 1 wherein said oxygen-containing gas and said slurry are fed separately to said entrained flow gasifier and are mixed therein prior to reaction.

6. The process of claim 1 wherein said coarse coal and said oxygen containing gas react within said fixed-bed gasifier under conditions whereby the heat value of said crude gas emerging therefrom is within the range of about 150 BTU to about 500 BTU and the temperature of said gas is within the range of about 500° F. to about 1000° F.

7. The process of claim 1 wherein said fine coal fractions and said oxygen containing gas react within said entrained flow gasifier under conditions whereby said crude gas emerging therefrom has a heat content within the range of about 60 BTU to about 350 and is at a temperature of about 2,000° F.

8. The process of claim 1 wherein said streams of purified gas are selectively used in combined cycle power generation.

9. The process of claim 1 wherein said streams of purified gas are used in processes for the preparation of any product from the group consisting of hydrocarbons, including methane, alcohols, including methanol, ammonia and hydrogen.

10. The process of claim 1 wherein at least part of said purified gas is converted to alcohols, including methanol.

11. The process of claim 1 wherein the ash from said entrained flow gasifier is quenched to facilitate disposal thereof.

12. The process of claim 1 wherein the hydrogen sulfide and coabsorbed carbon dioxide are converted to elemental sulfur and carbon dioxide stack gas.

13. A process for the gasification of coal wherein the total available coal is utilized in separate gasification systems and is converted into environmentally acceptable gaseous fuel and the quantity and type of waste products from said gasifier systems are kept to a minimum, comprising the following steps:

(a) separating coal into a coarse fraction of not less than ⅛ in. particle size and a fine fraction wherein at least 70% of particles pass a 200 mesh screen, (b) feeding the coarse fraction to a fixed bed non-slagging gasifier in which,
  (i) air and steam are blown through said fixed bed of coal with said gasifier at a pressure of about 350 lbs/sq. in. and at a temperature of about 900° F. to cause the coal to gasify and break down into crude gas of about 150 BTU containing hydrocarbons and other gaseous and particulate impurities.
  (ii) passing said 150 BTU gas at an entrance temperature of about 900° F. through scrubbers and through condensers to remove particulates and condensable components from said impurities as a liquid stream at a temperature of about 100° F. and passing said 150 BTU crude gas stream into a purification system for removal of hydrogen sulfide and coabsorbed carbon dioxide, (c) mixing said liquid stream with said fine fraction of coal and any required additional water to form a pumpable slurry, said liquid stream comprising tars, oils and phenol water in an amount to contribute significant fuel valve to said slurry, (d) passing said slurry with oxygen to an entrained flow gasifier maintained under a pressure of about 500 lbs./sq. in.,
  (i) rapidly reacting said mixture in said entrained flow gasifier to form a crude gas of about 350 BTU at a temperature of about 2,000° F.,
  (ii) passing said stream of 350 BTU crude gas through particulate removal scrubbers and heat exchangers to a gas purification system to remove hydrogen sulfide and coabsorbed carbon dioxide, and
  (iii) removing the ash from the gasifier and quenching it to temperatures for disposal.

(e) recovering said separate streams of purified gas.

* * * * *